UNITED STATES PATENT OFFICE.

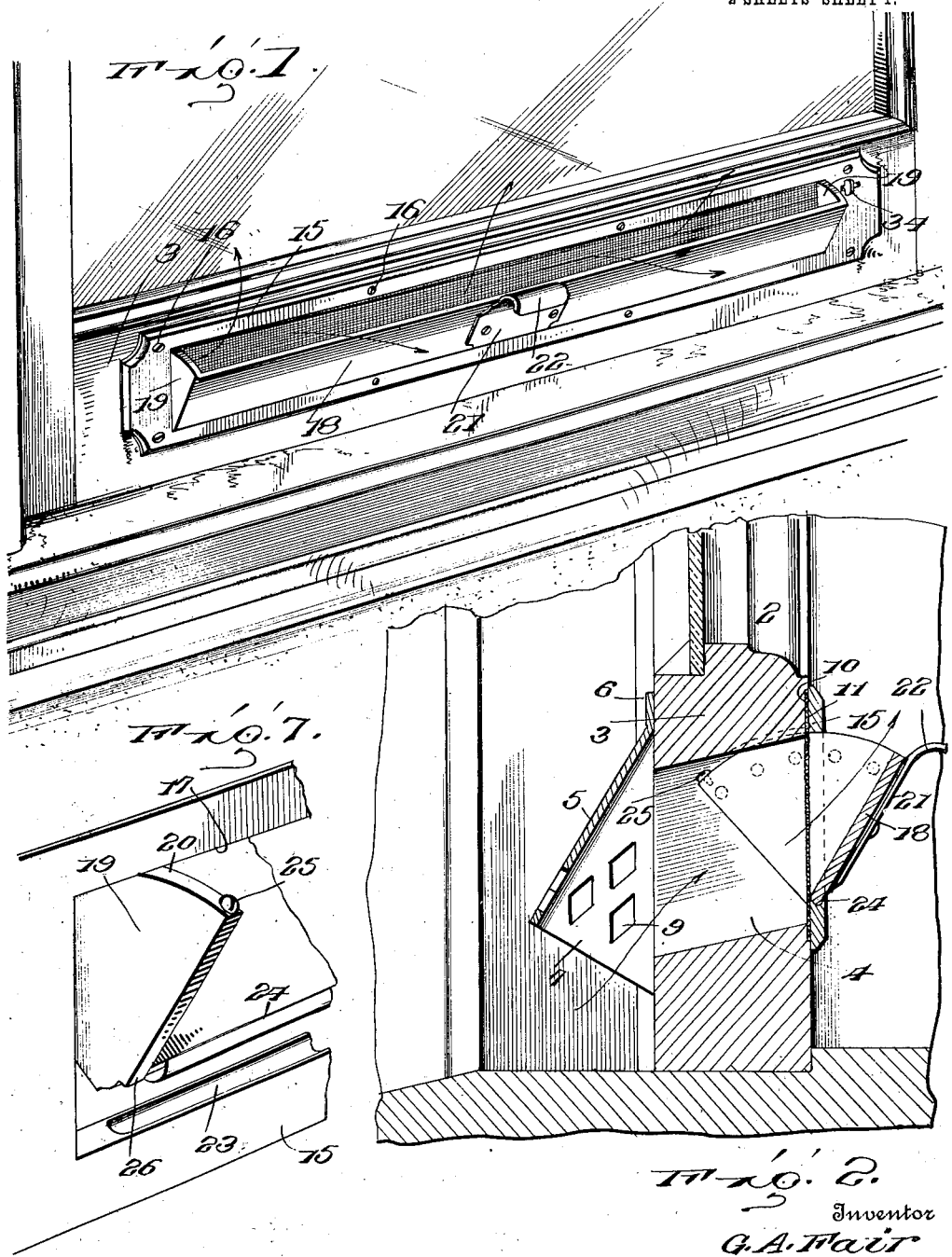

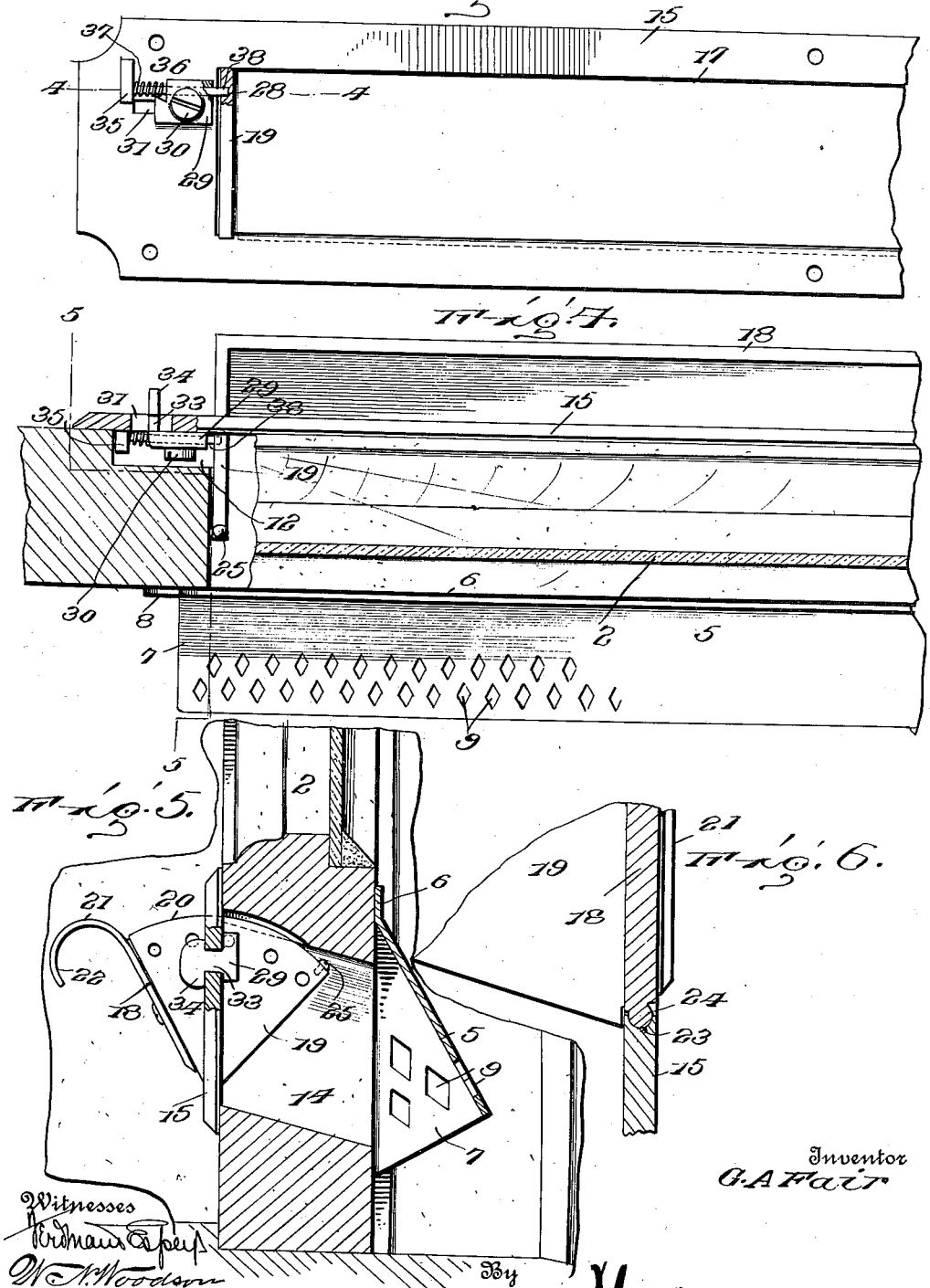

GEORGE A. FAIR, OF LOS ANGELES, CALIFORNIA.

WINDOW-VENTILATOR.

1,054,523.

Specification of Letters Patent.

Patented Feb. 25, 1913.

Application filed April 5, 1912. Serial No. 688,740.

*To all whom it may concern:*

Be it known that I, GEORGE A. FAIR, citizen of the United States, residing at Los Angeles, in the county of Los Angeles and State of California, have invented certain new and useful Improvements in Window-Ventilators, of which the following is a specification.

My invention relates to certain new and useful improvements in window ventilators, and particularly to that form of ventilator adapted to be attached to the lower rail of a window sash though not necessarily limited to this position, and in which the outer face of the sash is provided with a hood while the inner face of the hood is provided with a controlling damper whereby the draft through the ventilating opening may be controlled.

The primary object of my invention is the provision of a very simple and easily operated ventilator of this character which will enable a room to be thoroughly ventilated without the necessity of opening the sash, and in which the draft may be regulated to any desired extent.

A further object is to provide in this connection a damper plate mounted on the inner side of the window or ventilating opening and adapted to either close or partially open the ventilating opening when desired, which damper plate when closed will prevent any passage of air, and which will also prevent when closed the entrance of dust through the joint between the damper and the supporting plate therefor.

A further object is to so form the damper plate and so connect it to the supporting plate thereof that the damper may be readily removed whenever necessary and the parts may be readily assembled.

A further object is to provide in this connection a pivotal joint between the damper and the supporting plate of such character that the damper may be readily disengaged from the supporting plate as above stated, and that no opening is left between the supporting plate and the pivotal edge of the damper wherein dust, moisture or air can pass.

My invention is illustrated in the accompanying drawings wherein:

Figure 1 is a perspective view of my ventilator as applied to a window sash. Fig. 2 is a transverse vertical section through the lower rail of a window sash and through my ventilating appliance showing the damper partially open. Fig. 3 is a fragmentary rear elevation of the damper supporting plate and damper, a portion of the damper being shown in section to show the manner in which the latch engages with the damper to hold it in its adjusted position. Fig. 4 is a plan view of the damper supporting plate and damper and exterior hood, the sash rail being shown in section, and a portion of the supporting plate being broken away to show the latch construction. Fig. 5 is a vertical section on the line 5—5 of Fig. 4. Fig. 6 is an enlarged fragmentary vertical section through the hinge joint connecting the supporting plate and the damper. Fig. 7 is a fragmentary enlarged perspective view of a portion of the damper supporting plate and the damper therein showing the socket for the damper bead and showing the damper raised from its normal position so as to show the bead.

Corresponding and like parts are referred to in the following description and indicated in all the views of the accompanying drawings by the same reference characters.

Referring to these drawings, 2 designates a window sash and 3 the lower rail thereof formed with a ventilating opening 4 which extends longitudinally of the rail and whose upper and lower faces are upwardly and inwardly inclined.

Mounted upon the outer face of the rail 3 is a hood 5 the upper edge of which is provided with an attaching flange 6. The hood has an inwardly bent portion 7 provided with attaching flanges 8, and is preferably provided in its lower margin with perforations 9.

The inner face of the rail 3 is rabbeted as at 10, and disposed in this rabbet is a sheet of fine wire gauze designated 11. The opening 4 extends beyond the gauze at each end. At one end of the opening 4, the inner face of the rail is formed with a recess 12, provided on its upper edge with an upwardly extending recess 13. The upper face of the opening 4 at each end of the opening is formed with the recesses 14 to accommodate the end wings of the damper.

Mounted upon the inner face of the rail 3 and exterior to the wire gauze 11 is a damper supporting plate designated 15. This plate is of sufficient length to entirely cover the opening 4 and extend over the recess 12. The plate is made of relatively heavy sheet metal attached to the inner face of the rail by means of screws 16. The plate is formed with an opening 17 and in this opening is fitted a damper plate 18. This plate as illustrated in Fig. 1 is formed at its ends with the inwardly extending wings 19 which fit smoothly against the end walls of the opening 17. These wings may be made integral with the damper plate 18 or attached thereto. The wings 19 are formed with arcuate upper edge faces 20, the arc being struck from a center coincident with the lower edge of the damper. Attached to the face of the damper plate 18 is a handle plate 21 and having a handle 22.

In order to provide a very simple, cheap, dust-proof and thoroughly effective pivotal joint between the upper edge of the damper and the supporting plate 15, I form the edge of the lower wall of the opening 17 in the supporting plate with a longitudinally extending edge recess 23 which is rounded in the arc of a circle, and which forms a hinge socket, and I form the upper edge of the damper 18 with a bead 24 adapted to fit snugly in the recess 23. The curvature of the bead 24 is the same as that of the socket or recess 23 so that a hinge joint is formed between these parts permitting the damper 18 to be rotated into various angular relations to the plate 17. The arcuate edge 20 is struck from the center upon which the damper turns, and this arcuate edge bears against the upper edge wall of the opening 17. When the damper is in place, these wings bearing against the upper edge of the opening 17 hold the bead 24 in place within the socket 23, but while permitting a rotation of the damper, prevent any disengagement between the damper and the plate 15 so long as the damper is not rotated to a greater degree than that permitted by the wings 19.

In order to prevent the damper being outwardly shifted or rotated to such position as to disengage the wings 19 from the lower edge wall of the opening 17, I provide stops 25 projecting upward from the upper edge of the wings 19 and disposed at the inner corners of the wings. These stops may be of any suitable form but as shown are detachable so as to permit the damper to be removed when desired, and preferably are in the form of screws. When these screws are screwed home, the heads project slightly beyond the upper edge face of the wings and contact with the upper wall of the opening 17. In order to prevent the too great movement of the damper in the opposite direction, one or both of the wings 19 at their lower corners are cut away to provide a face 26ª which rests upon the edge wall of the damper supporting plate 15 and a shoulder 26 projecting rearward so as to form a stop shoulder contacting with the inner face of the supporting plate 15 when the damper is closed.

When it is desired to remove the damper from engagement with the supporting plate, it is only necessary to remove the stop screws 25. Then the damper plate may be rotated outward until the bead 24 slips out of engagement with the socket 23.

In order to hold the damper set in any desired adjusted position, I provide one of the wings 19 with a series of recesses or semiperforations designated 28, and provide a latching device adapted to engage any one of these perforations. The latching device illustrated and which is preferred by me, comprises a slotted plate 29 disposed upon the rear face of the plate 15 at one end thereof. Passing through the slot of this plate and engaging the plate 15 is a guide screw 30. The plate 15 is formed with a longitudinally extending slot 31 and the plate 29 is formed with an ear 32, one part of which is contracted as at 33 and extends through the slot 31 where it is enlarged to form a head 34 extending transversely of the slot 31. Formed upon the inner face of the plate 15 is an abutment 35, against which bears a spring 36 carried upon a pin 37 projecting from the rear end of the plate 29. The forward end of the plate 29 is provided with a bolt 38 adapted to engage in any one of the perforations.

It is to be particularly noted that the hinge joint formed between the plate 15 and the damper is such as to prevent the passage of air at this hinge joint in all positions of the damper, and that it is also pointed out that this peculiar form of hinge joint prevents the collection of dust at this point which would tend to impede the opening and closing of the damper. The smooth contacting faces of the bead and recessed socket in which the bead fits provide for a very smooth and easy opening of the damper and do not require lubrication. Furthermore, this joint permits the easy removal of the damper plate as previously pointed out and the easy replacement of the same, and also permits the ready assembling of the parts. Furthermore, it is a cheap and thoroughly effective construction. Another advantage of the peculiar hinge joint is that the damper is hingedly connected to the supporting plate along its entire extent and not merely at intervals. Thus the damper is held from any buckling and the plate from which the damper is formed is held flat and straight so that the free edge of the plate will make a good contact with the adjacent wall of the damper opening when the damper is closed.

Inasmuch as the upper and lower walls of the passage 4 are inclined to the face of the sash rail, any dirt and dust which may accumulate within the opening 4 will naturally tend to gravitate outward. When it is desired to clean this recess, however, or passage in case of necessity, it is only necessary to remove the damper supporting plate and the screen which is held in position by said plate, whereupon this passage may be easily brushed out.

The wings on the ends of the damper prevent the air from passing out laterally so that all the air that passes through the ventilator is directed upward, provided of course the damper is adjusted in an upwardly extending position. By providing a locking means, it is possible to hold the damper in any adjusted position and the damper will not be affected by a draft of air passing through the passage as it would be if it was freely pivoted.

It will be seen that wind can not enter through the recess 12 and the slot 31 for the reason that when the damper is closed, or even partly closed, the adjacent wing 19 will prevent the passage of air from the main opening into this recess 12.

While I have referred to the use of my ventilator in a window sash, it is to be particularly understood that I do not limit the ventilator to this use as it may be installed in doors, particularly outside doors, in the casing above windows, in transoms over doors, in the fronts of stores, as for instance at the top of store windows, car windows, etc.

By the use of one of my ventilators at the top of a door and one at the bottom, I can secure an inlet of fresh air and an outlet of the vitiated air, and it is obvious that the same use can be made of the ventilators by installing them above and below the ordinary window frames of houses. It is obvious also that the ventilator might be used in a special ventilator frame adapted to be put in place when desired beneath the window sash resting on the sill thereof and removed when necessary.

What I claim is:

A ventilator of the character described including a plate having a ventilating opening therethrough, a damper controlling said ventilating opening, one edge wall of said opening and one edge of the damper being formed, one with a continuously rounded edge bead and the other with a concavely rounded socket coacting with the edge bead, the damper being formed with wings extending at right angles to the face of the damper and disposed at the ends thereof, said wings having arcuate edge faces engaging the edge wall of the ventilating opening opposite the damper supporting edge wall thereof and holding the damper in engagement with said edge wall, each of said wings at its lower corner being extended radially rearward and beyond the adjacent lower edge of the damper plate to form stop shoulders limiting the closing movement of the damper, the ends of said wings being also provided with stops limiting the opening movement of the damper.

In testimony whereof I affix my signature in presence of two witnesses.

GEORGE A. FAIR.

Witnesses:
MATTIE A. FAIR,
S. E. VERMILYEA.